A. KOLSKY, DEC'D.
J. PETRACEK, ADMINISTRATOR.
AIR MOTOR.
APPLICATION FILED NOV. 10, 1908.

997,207.

Patented July 4, 1911.
4 SHEETS—SHEET 1.

Witnesses
Frank R Hove
H. C. Rodgers.

Inventor
Anthony Kolsky Dec'd.
James Petracek, Adm'r:
By George G Losen Atty

COLUMBIA PLANOGRAPH CO., WASHINGTON, D. C.

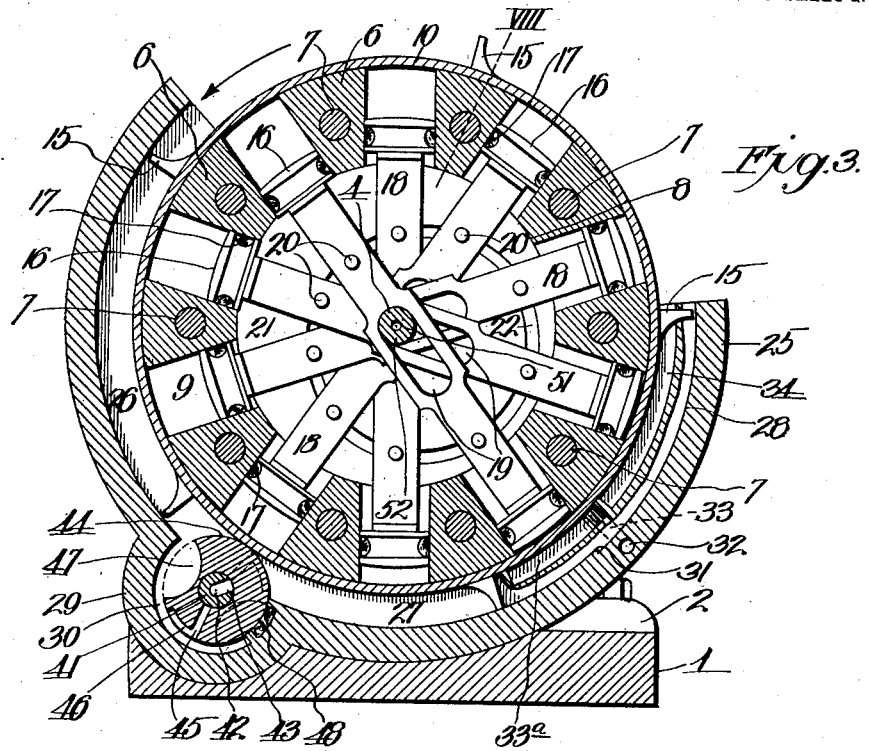
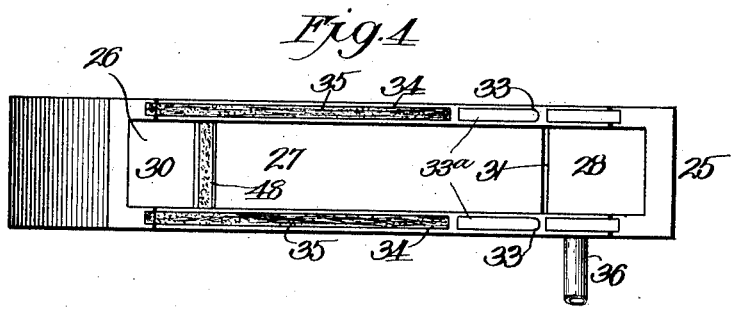
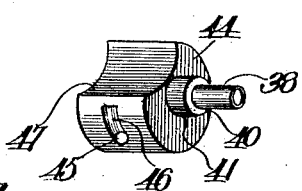
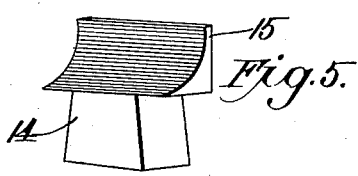

A. KOLSKY, DEC'D.
J. PETRACEK, ADMINISTRATOR.
AIR MOTOR.
APPLICATION FILED NOV. 10, 1908.
997,207.
Patented July 4, 1911.
4 SHEETS—SHEET 3.
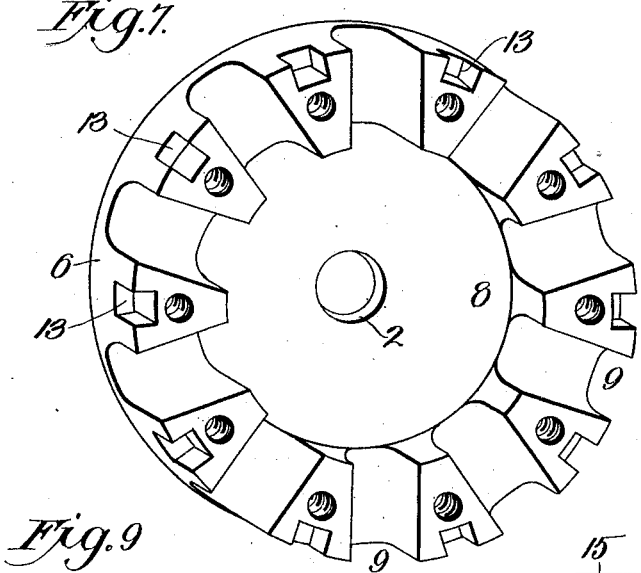
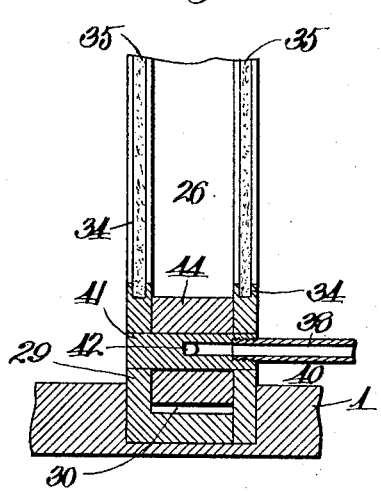
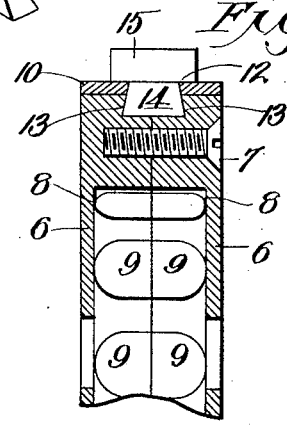
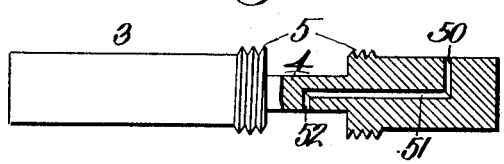
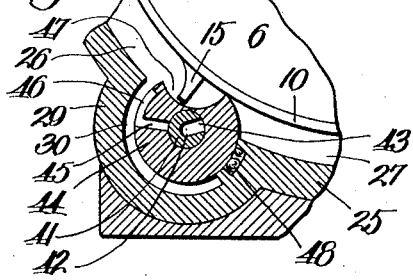
Witnesses
Frank R Glore
H. C. Rodgers.
Inventor
Anthony Kolsky, Dec'd.
James Petracek, Adm'r.
By George H. Thorpe Atty.

A. KOLSKY, DEC'D.
J. PETRACEK, ADMINISTRATOR.
AIR MOTOR.
APPLICATION FILED NOV. 10, 1908.
997,207.
Patented July 4, 1911.
4 SHEETS—SHEET 4.
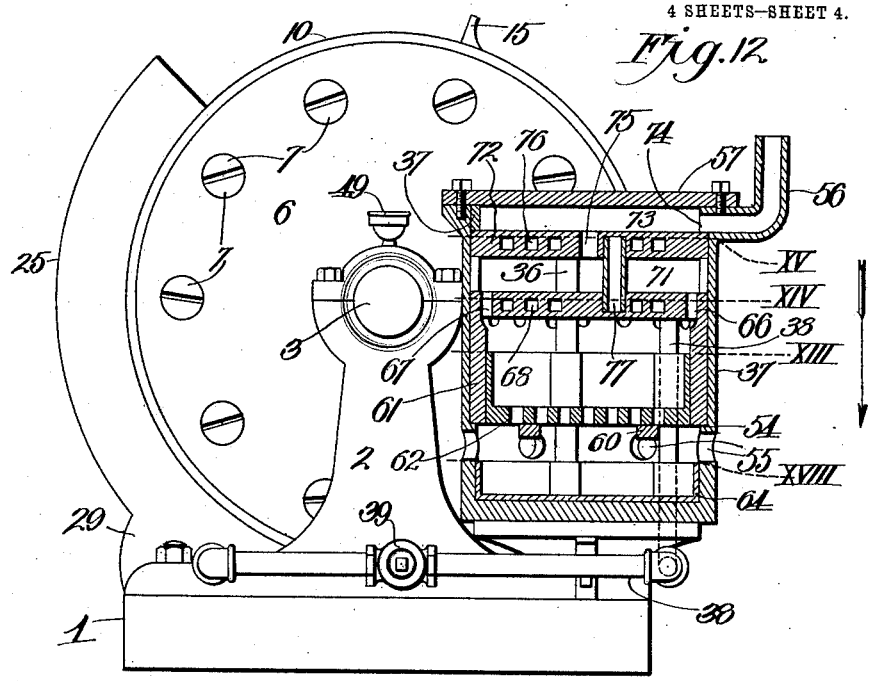
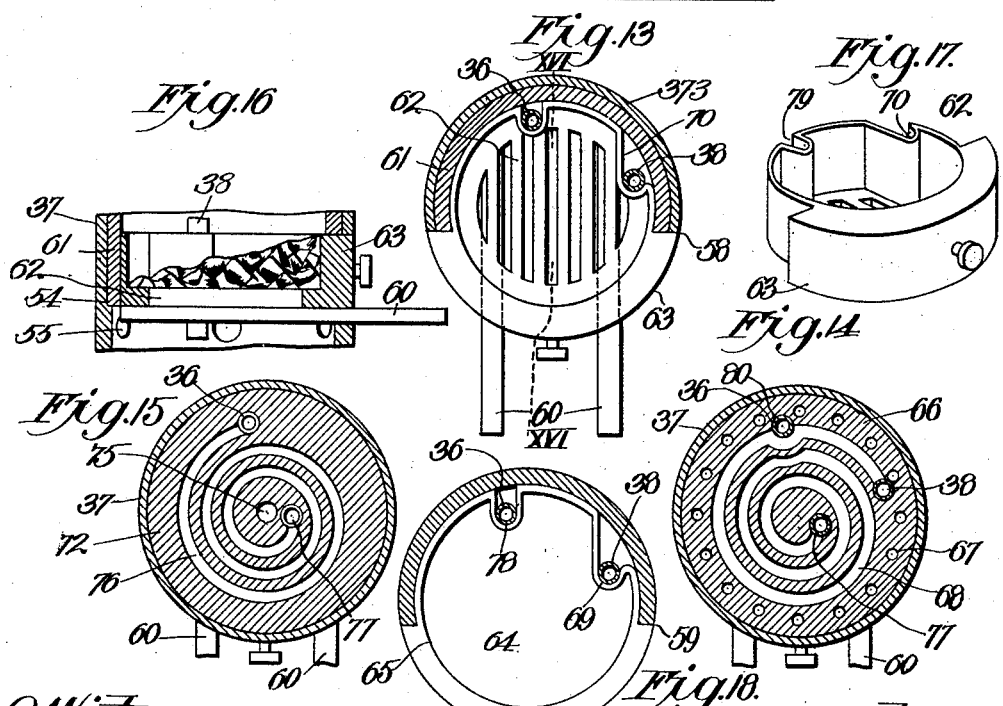
Witnesses
Frank R Elon
H. C. Rodgers
Inventor
Anthony Kolsky Dec'd.
By James Petracek Adm'r.
George M Thorpe Atty.

UNITED STATES PATENT OFFICE.

JAMES PETRACEK, OF OBERLIN, KANSAS, ADMINISTRATOR OF ANTHONY KOLSKY, DECEASED.

AIR-MOTOR.

997,207.  Specification of Letters Patent.  Patented July 4, 1911.

Application filed November 10, 1908. Serial No. 461,977.

*To all whom it may concern:*

Be it known that I, JAMES PETRACEK, a citizen of the United States, and a resident of Oberlin, in the county of Decatur, State of Kansas, am administrator of the estate of ANTHONY KOLSKY, deceased, who invented new and useful Improvements in Air-Motors, of which the following is a specification.

This invention relates to air motors, and the object is to produce a machine of this character which operates efficiently and reliably, is easily controlled, and is of small, compact, strong and durable construction.

With this object in view, the invention consists in certain novel and peculiar features of construction and organization as hereinafter described and claimed, and in order that it may be fully understood reference is to be had to the accompanying drawings, in which—

Figure 1:
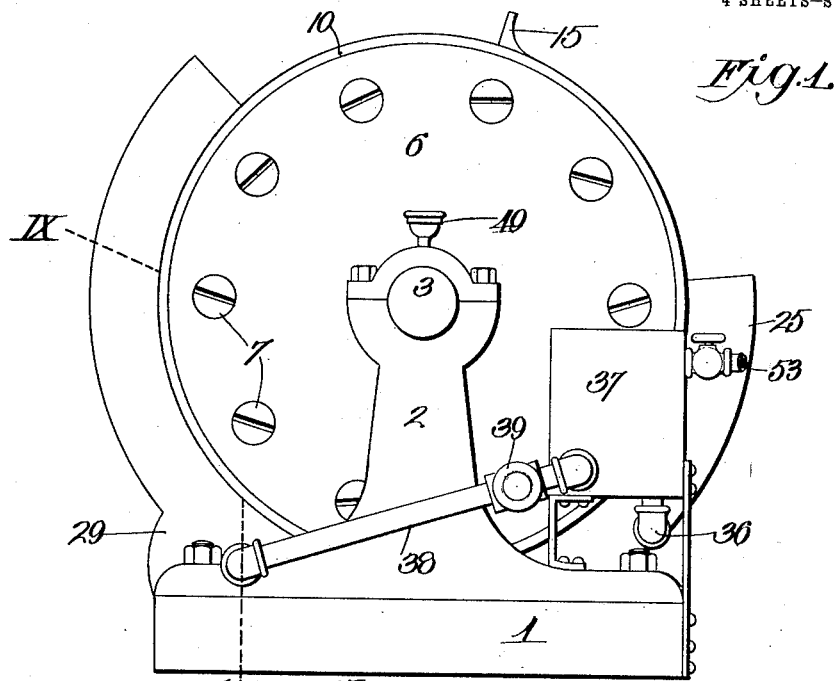
Figure 2:
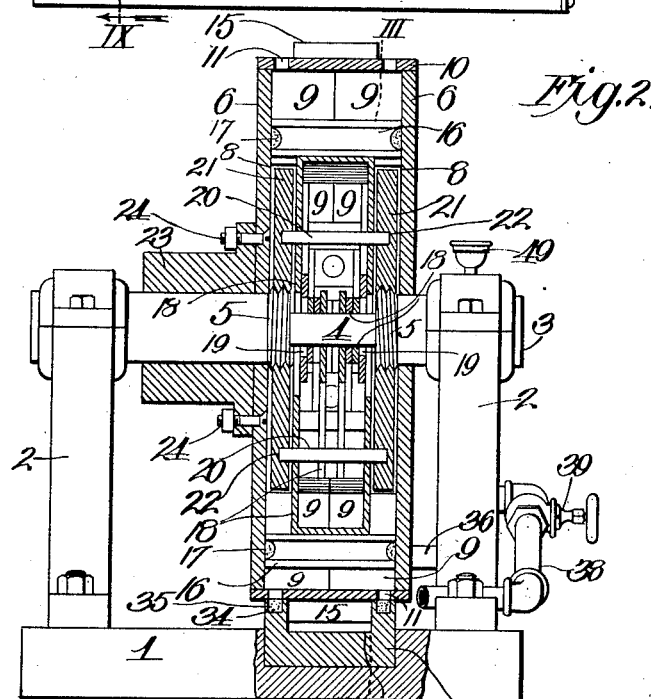

Figure 1, is a side view of a machine constructed in accordance with the invention. Fig. 2, is a central vertical section of the same. Fig. 3, is a vertical section taken on the line III—III of Fig. 2. Fig. 4, is a top plan view of a casing forming part of the machine. Fig. 5, is an enlarged detail perspective view of one of the air-abutment surfaces. Fig. 6, is a detail perspective view of the rotary valve for periodically supplying air under pressure and then cutting off such supply of air. Fig. 7, is a perspective view of part of the machine. Fig. 8, is a section taken on the line VIII—VIII of Fig. 3, but showing only the wheel without its shaft or other internal mechanism. Fig. 9, is a section on the line IX—IX of Fig. 1. Fig. 10, is a vertical section of the casing with the rotary valve thereof occupying a position intermediate of that shown by full and dotted lines in Fig. 3. Fig. 11, is a vertical section of the stationary shaft to show the lubricant passage therein. Fig. 12, is a view showing the machine in elevation and the compressed air tank in the form of a heater. Fig. 13, is a horizontal section on the dotted line XIII of Fig. 12. Fig. 14, is a horizontal section on the line XIV of Fig. 12. Fig. 15, is a horizontal section on the line XV of Fig. 12. Fig. 16, is a vertical section on the line XVI—XVI of Fig. 13. Fig. 17, is a detail perspective view of the grate pan. Fig. 18, is a horizontal section on the dotted line XVIII of Fig. 12.

Referring to the drawings in detail, 1 designates a suitable base or foundation, and 2, standards erected thereon, and forming rigid supports for the stationary axle 3, said axle at a suitable point being reduced in diameter to produce the smaller or plunger guide portion 4, and having threaded portions 5, at opposite ends of said reduced portion. The wheel preferably consists of two circular plates 6, secured rigidly together by the preferably equidistant screw bolts 7, aranged in a circular series. Inward of the screw bolts the plates are provided with circular recesses 8, which conjointly form a central cylindrical chamber, and between the bolts are provided with radial grooves 9, which communicate with each other and with said central chamber, and conjointly form piston chambers or cylinders, the outer ends of said cylinders being closed by an air-tight rim 10, provided with passages 11, communicating with the cylinders to alternately admit air therein and form exits for such air after it is compressed, as hereinafter explained.

The wheel is provided by preference with ten cylinders and the rim with five equidistant openings 12, formed between the adjacent cylinders and opening into said openings are dovetail recesses in the wheel, said recesses being formed by communicating notches 13, in the inner faces of plates 6, said dove-tail recesses receiving snugly the outwardly tapering stems 14 of abutments 15, extending transversely of the wheel and fitting against the outer side of the rim.

Preliminary to securing the abutments in place, the plates 6 must be moved apart a sufficient distance to admit said stems, it being also understood that the openings 12 in the rim are made large enough for the same purpose, but of course are smaller than the abutments. The plates are then screwed tightly together again and the dove-tail relation between them and said stems, forces the abutments inward and clamps them tightly down upon the rim so as to hold the latter in position, it being understood of course that the abutments may be otherwise secured in position and the rim otherwise secured, without departing from the spirit of the invention, and that any suitable packing, not shown, may be employed between the rim and plates 6, to prevent the leakage of air from the cylinders.

16 designates annularly grooved pistons fitting snugly in the cylinders and made air-tight with respect thereto, by means of packing rings 17 in said grooves, and rigidly connecting each pair of diametrically opposite pistons, is a skeleton rectangular piston stem 18, provided with a longitudinal slot 19, engaging the reduced portion 4 of the stationary shaft or axle, as shown clearly in Fig. 3, and in order that said piston stems may reciprocate without conflict, they are nested together one within the other, as shown most clearly in Fig. 2, where it will be seen that four of the stems extend through one of them, three of the remaining stems also through the second, the next to the smallest and the smallest also through the intermediate size, and the smallest through that which is next in size.

Each stem is provided with a pair of cross pins 20 at equal distances from and at the opposite sides of its center, the ends of said pins fitting slidingly in the grooves 22 formed in the inner sides of disks 21, arranged between the stems and plates 6, as shown most clearly in Fig. 2, said disks being rigidly secured upon the threaded portions 5 of the stationary shaft or axle, which threaded portions, as will be readily understood by reference to Fig. 2, are so arranged that the tendency of the disks is to move outward from the stems and therefore impose no frictional resistance to the reciprocation of the pistons, it being understood of course that said disks may be otherwise rigidly secured upon the axle, if desired. The grooves 22 are disposed eccentrically of the stationary shaft as hereinafter more particularly pointed out and are slightly elongated to describe an ellipse or oval in order to permit the pistons to reciprocate radially of the stationary axle as would not be possible if the grooves 22 described a circle, and the piston stems each have a pair of pins 20, it being desirable that each stem have the pair of pins in order to obtain the greatest possible leverage for reciprocating the pistons. If the stems were each equipped with a single pin the grooves 22 could be circular in form, but such an arrangement would be at a sacrifice of leverage on the pistons because the lateral pressure of the walls of the grooves on one pin would not be counteracted by opposite lateral pressure as is the case where two pins, one at each side of the stationary axle, are employed.

For the purpose of transmitting motion through the medium of a belt, not shown, a pulley 23, is journaled on the stationary shaft or axle and is bolted as at 24, or otherwise rigidly secured to the adjacent plate 6, of the wheel, as shown in Fig. 2.

25 is a casing of semicircular form and U-shape in cross section, said casing concentrically surrounding and snugly embracing at least half of the periphery of the wheel, being also secured rigidly in the base in any suitable manner. The casing has its channel identified by the reference characters 26, 27 and 28, portions 26 and 28 of the channel being of greater depth than the abutments so that there shall be no unnecessary frictional resistance imposed on the latter in passing through said portions of the channel, while channel portion 27 forms a substantially air-tight joint with the abutments. At the junction of channel portions 26 and 27, the casing is outwardly enlarged at 29, and provided with a segmental chamber 30, and at the junction of channel portions 27 and 28, a shoulder 31, is formed. Near said shoulder a transverse passage 32 is formed in the casing and extending radially inward from the ends of said passage and in the vertical plane of passages 11, are passages 33 which extend up through the flange or side portion of the casing and communicate with the chambers $33^a$ thereof, so as to receive compressed air from each cylinder as its passages 11 communicate with said chambers $33^a$, it being understood in this connection, by reference to Fig. 3, that a radial line drawn from the center of the stationary shaft through the axis of the eccentric grooves, would cut through the casing approximately in line with shoulder 31, so that the air in the cylinders is compressed to the fullest extent as the passages of such cylinders successively communicate with said passages 33, and in order that there shall be no possible escape for the air from the casing except through its front end, the flanges of the casing are provided with grooves 34, containing packing strips 35, which engage, with an air-tight relation, the periphery of the wheel at opposite sides of the abutments; said grooves 34 and packing strips 35 extending to the end of the casing from which the abutments successively emerge in order that the air from the cylinders shall be prevented from escaping through passages 11 during the entire outward stroke of the pistons.

36 is a pipe tapped into one end of passage 32, and communicating at its other end with a compressed air tank 37, supported as shown in Fig. 1, or otherwise, and leading from said tank is a pipe 38, controlled by a throttle-valve 39 of any suitable construction. The opposite end of pipe 38 is tapped as at 40, into the stationary shaft or axle 41, extending through the casing, said shaft or axle having an axial passage 42, communicating with said pipe and terminating in a radial passage 43, extending in a direction to discharge toward the portion 27 of the channel of the casing. Journaled upon said stationary shaft or axle and fitting snugly against the side walls of the casing with the least possible frictional resistance, is a rotary valve or cut-off 44, the circumference of the same being equal to one-fifth of the circumference of the wheel. The rotary valve or cut-off, furthermore, normally closes communication between channels 26 and 27, and at such time presses frictionally against the wheel so that the revolution of the latter shall impart corresponding movement to said valve.

At a suitable point the valve is provided with a passage 45, extending from its periphery to that of its stationary shaft or axle, and at the outer end of passage 45, and communicating therewith, is provided with a circumferential passage or groove 46, and with a segmental recess 47, sufficiently deep to admit of the passage therethrough of the abutments, and in order to close the space between the periphery of said valve and passage 27, the casing is provided with a packing 48, bearing against the periphery of the valve.

For the purpose of lubricating the passages, an oil cup 49 is mounted on one of the standards above the stationary axle, so that oil therefrom may flow down through the radial passage 50, of said shaft into the passage 51, and from the latter drop through the downwardly extending passage 52, whence it enters the successively presented cylinders. This oil also, by running from the cylinders and by striking on the portions of the plates 6 between the cylinders and spreading therefrom thoroughly lubricates the entire surface of disks 21, and the piston stems, and reduces friction on the axle, as will be readily seen.

In the practical operation of the machine, the rotation of the wheel as hereinbefore explained, rotates the valve or cut-off, the parts being so proportioned that as disengagement between them takes place, one of the abutments enters recess 47 of the valve, and by traveling along its face continues the rotation of such valve, and eventually passes from engagement with the same, and at the same instant, or shortly before, the periphery of the valve again comes into engagement with the wheel so that the valve continues its movement. At the instant recess 47 attains the position shown in dotted lines Fig. 3, and is thereby cut out of communication with channel 27, passage 45 communicates with passage 43, the former passage at such time being so disposed that the air under pressure from passage 43, passes out through passage 45, and passage or groove 46, into channel 27, and impinges on the abutment previously referred to, so as to move the same and therefore the wheel, it being understood of course that during the entire operation of the machine the throttle valve 39 stands open so that the compressed air from the tank 37, may pass through pipe 38 and passage 42, to said passage 43. This supply of air under pressure, continues until the abutment has traversed about one-fourth the length of channel 27, by which time the valve has revolved a sufficient distance to cut off such supply of air to the channel 27, the expansion of the air previously introduced serving to continue the pressure against said abutment until it has passed shoulder 31, by which time its expansive property has been exhausted and direct pressure is being applied on the following abutment, that is to say, just as the abutment which is advancing under the expansive action of the air in channel 27, passes out of said channel, the following abutment has entered the peripheral recess of the valve and has rotated the same until said recess communicates with channel 27, the expansive properties of the air being exhausted by this time. For a very small fractional part of its revolution, momentum is relied upon to operate the wheel that is until the said recess 47 has attained the position shown in dotted lines, when direct pressure of air is applied on said second abutment.

All subsequent operations are repetitions of those described, as long as the machine is in operation.

The compressed air to operate the machine may be introduced into the tank through a valve-controlled pipe 53, or the compressed air supply through pipe 53 may be augmented by virtue of the air supplied through the operation of the machine. Air under pressure is supplied through to the tank from each cylinder as the latter's passages successively communicate with chambers 33$^a$, the compressed air being completely exhausted from each cylinder by the time its passages 11, are in radial alinement with passages 33, it being apparent that the rotation of the wheel with the pins 20 of the piston stems engaging the eccentric grooves of the stationary disks, will cause the pistons to reciprocate, one piston of a stem being at its outermost limit of movement when the pins on the stem of said piston occupy the same radial plane as the axes of the shaft and the eccentric grooves. The pins of the piston stem occupy the same plane as the axes of the shaft and grooves and passages 33, when the lower piston of said stem occupies its outermost and its upper piston its innermost position. As the rotation of the wheel continues the relation between the pins and grooves gradually reverses the positions of said pistons, so that by the time the outwardly moving piston has its passages 11 closed by the packed flanges of the casing it will begin to compress air in its cylinder and continues such compression until it communicates with passages 33. As the inward movement of the opposite piston starts, its cylinder passages 11, communicate with the atmosphere through the unpacked portions of grooves 34, though it is to be understood that that portion of the casing at the opposite sides of passages 33 from the valve, may and preferably will be dispensed with. It will be apparent by reference to Fig. 3, that because the pins of each stem are not continually in the same plane as the axes of the grooves 22, said pins will not describe a perfect circle but on the other hand will describe a course slightly elliptical and hence the grooves in which said pins travel must be of corresponding form.

It will be seen that with each revolution of the wheel compressed air is forced from each of the ten cylinders into the tank, which charge of air, supplemented by the charge of compressed air supplied to the tank through valve-controlled pipe 53, serves to operate the motor, the movement of the latter being transmitted through a belt wheel or pulley 23 and a belt, not shown, or other equivalent mechanism.

Referring to the construction shown in Figs. 12 to 18, inclusive, it will be seen that the compressed air tank 37, is in the form of a heater. In this form the tank is provided with an internal shoulder 54, a series of inlet openings 55 below the shoulder with an escape pipe 56, at its upper end. It is also provided with a removable top 57, a semi-circular opening or slot 58 having its lower side in the plane of shoulder 54, and below the openings 55 with a slot 59. It is also provided with one or more horizontal bars 60 having their upper sides in the plane of the shoulder 54, and projecting some distance beyond the front side of the tank. 61 is a ring fitting upon the internal shoulder and 62 a grate pan resting upon the bars 60 and having the forward half 63 of its wall of sufficient thickness to close the slot 58. Below the grate the tank may contain an ash-pan 64, insertible or removable through slot 54 and having the forward half 65 of its front wall of sufficient thickness to close slot 59.

Resting upon ring 61, is a partition 66, having a series of perforations 67 near its outer edge which communicate with the grate-pan and said partition is provided with a spiral passage 68, communicating at its outer end with the upwardly projecting end of pipe 38, said pipe extending about into the tank within ring 61, the ash-pan and grate-pan being provided respectively, with external cavities 69 and 70, to accommodate said pipe without interfering with the insertion or removal of said pans.

71 is a ring resting upon partition 66, externally of the perforations 67 thereof, and 72, a partition fitting between ring 71 and ring 73, the latter holding the partition 72 against upward movement through the instrumentality of the cover 57, and said ring 73, is provided with a hole 74, communicating with the escape pipe 56. Partition 72 is provided with a central hole 75 establishing communication between the chambers above and below said partition, so that the products of combustion from the fuel on the grate and the air entering the tank through draft openings 55 may pass up through perforations 67, hole 75, and the escape pipe 56 to the atmosphere. The partition 72 is provided with a spiral passage 76, having its inner end connected by a short vertical pipe 77 to the inner end of the spiral passage of partition 66 and the outer end of passage 76 communicates with the upper end of pipe 36, hereinbefore described; said pipe like the extension of pipe 38 extending up into the tank within ring 61 and also through the external recesses 78 and 79 in the ash-pan and grate-pan, respectively, said recesses being for the same purpose as recesses 69 and 70 hereinbefore referred to. The pipe 36 also extends up through a hole 80 in the partition 66 but does not communicate with the spiral passage thereof.

Assuming that burning fuel is within the grate-pan, as shown for instance in Fig. 16, and that the combustion thereof is supported by the passage of air into the tank through the openings 55, it will be seen that the heat generated will heat the compressed air supplied to the tank by the machine, and as a result of such heating of the compressed air, its volume will be increased and it will pass under pressure through pipe 38, and valve 44, into the chamber 27 for the purpose of operating the machine. The heating of the air therefore will produce the same effect as the supply of air under pressure to the tank from a source outside the machine itself, that is as a source of air supplied through pipe 53, shown in Fig. 1. It will have the additional advantage over a supply of air through pipe 53 in that to supply the latter, pumping mechanism will be needed, which of course, would add to the expense of construction and operation.

It will be understood that this motor is not operative except when supplied with air under pressure through pipe 53 from a tank which is either supplied with air from a source independent of the motor or in which the pressure of the air supplied to said tank is augmented by heat.

From the above description it will be apparent that an air motor is produced which possesses the features of advantage enumerated as desirable in the statement of the object of the invention and which is obviously susceptible of modification in various particulars without departing from the principle of construction involved.

Having thus described the invention what is claimed as new and desired to secure by Letters-Patent, is:—

1. In a machine of the character described, the combination of a segmental casing having a channel, a wheel journaled concentrically with said casing and having its periphery bridging the channel of the casing and provided with peripheral abutments to pass successively through said channel, a stationary shaft in the casing and provided with a passage, a rotary valve journaled on said shaft and normally peripherally engaged by the wheel and provided with a peripheral recess and a radial passage adapted to communicate with the passage in the shaft and discharge air into the channel and against the abutment which has last passed the valve.

2. In a machine of the character described, the combination of a segmental casing having a channel, a wheel journaled concentrically with said casing and having its periphery bridging the channel of the casing and provided with peripheral abutments to pass successively through said channel, a stationary shaft in the casing and provided with a passage, a rotary valve journaled on said shaft and normally peripherally engaged by the wheel and provided with a peripheral recess and a radial passage adapted to communicate with the passage in the shaft and discharge air into the channel and against the abutment which has last passed the valve, and a valve-controlled pipe for conducting air under pressure into said shaft.

3. In a machine of the character described, the combination of a segmental casing provided with a channel having its middle portion shallower than the end portions, an enlargement on said casing having a chamber at the junction of one end portion and the middle portion of the channel, a stationary shaft bridging said chamber and provided with a passage, a rotary valve journaled on said shaft separating the said portions of the channel and having an air-tight connection with the casing, a peripheral recess and a radial passage, a wheel having its periphery bridging the channel of the casing and normally engaging the periphery of the valve, and having peripheral abutments to pass successively through the casing and the recess of the valve, and having a substantially air-tight connection with the middle portion of the channel, and valve-controlled means for supplying air under pressure to the passage of the valve shaft.

4. In a machine of the character described, the combination of a segmental casing provided with a channel having its middle portion shallower than the end portions, an enlargement on said casing having a chamber at the junction of one end portion and the middle portion of the channel, a stationary shaft bridging said chamber and provided with a passage, a rotary valve journaled on said shaft, separating the said portions of the channel and having an air-tight connection with the casing, a peripheral recess and a radial passage, a second stationary shaft, a wheel journaled thereon and bridging the channel of the casing, consisting of a pair of plates secured together, and provided in their meeting faces with dove-tail recesses, a rim common to both plates and provided with openings communicating with said recesses and transverse abutments at the outer side of the rim and provided with dove-tail stems, extending through the rim openings, and engaging the dove-tail recesses of the wheel, said abutments being adapted to successively pass through the casing and to form an air-tight connection with the same after passing the valve, valve-controlled means for supplying air under pressure to the passage of the valve-shaft, and a power transmitting wheel movable with the first-named wheel.

5. In a machine of the character described, the combination of a suitable wheel having radial air-compressing cylinders and a passage connecting each cylinder with the atmosphere, stationary disks within the wheel having elliptic grooves, pistons in said cylinders, stems connecting the diametrically opposite pistons and provided with pins engaging said grooves, a segmental casing embracing part of the periphery of the wheel and closing the passages to the atmosphere within its length and having a passage in substantially the same radial plane as the axes of the wheel and grooves, adapted to receive air compressed in said cylinders as the atmospheric passages of the latter successively communicate with said casing passage, a compressed-air tank connected to said casing-passage to receive such air, means to heat the air in the tank, a valve-controlled discharge-pipe for said tank, and means whereby the air discharged from said tank shall be caused to impinge against and rotate said wheel.

6. In a machine of the character described, the combination of a suitable wheel having radial air-compressing cylinders, stationary disks within the wheel having elliptic grooves, and a passage connecting each cylinder with the atmosphere, pistons in said cylinders, stems connecting the diametrically opposite pistons and provided with pins engaging said grooves, a segmental casing embracing part of the periphery of the wheel and closing the passages to the atmosphere within its length and having a passage in substantially the same radial plane as the axes of the wheel and grooves, adapted to receive air compressed in said cylinders as the atmospheric passages of the latter successively communicate with said casing passage, and a channel bridged by said wheel and adapted to successively receive said abutments, a compressed-air tank connected to said casing passage to receive air therefrom, a stationary-shaft in the casing, provided with a passage, a valve-controlled pipe connecting the tank with the passage of said shaft, a rotary-valve journaled on the last-named shaft, frictionally engaging the periphery of the wheel and provided with a passage connected to the passage of the stationary shaft and leading from its inner to its outer side and with a peripheral recess, and means for heating the air in said tank.

7. In a machine of the character described, the combination of a segmental casing provided with a channel, a wheel journaled concentrically of said casing and having its periphery bridging the channel thereof and provided with abutments to pass successively through said channel, a rotary valve journaled in said casing and having its periphery normally bearing against that of the wheel and provided with a peripheral recess to successively receive the abutments of the wheel and provided with a passage to discharge air against said abutments as the latter pass out of engagement with said recess, means carried by said wheel for compressing air, a tank to receive such air, means to heat the air while in the tank, and a valve-controlled pipe to conduct such heated air from the tank to the rotary valve.

In testimony whereof I affix my signature in the presence of two witnesses.

JAMES PETRACEK,
*Administrator for the estate of Anthony Kolsky.*

Witnesses:
J. H. CONLEY,
FRANK SHIMMICK.

---

Copies of this patent may be obtained for five cents each, by addressing the "Commissioner of Patents, Washington, D. C."